Patented Aug. 2, 1932

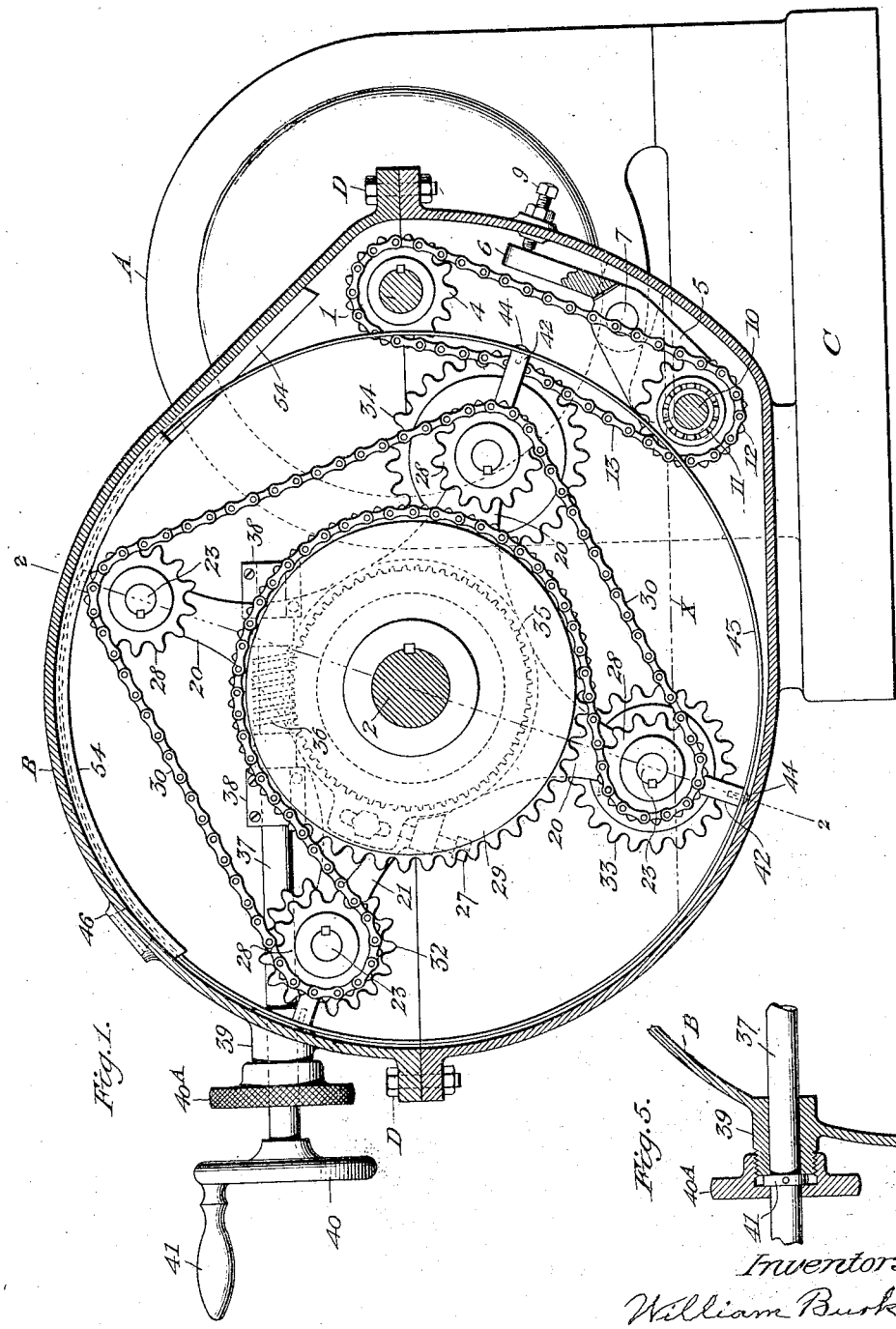

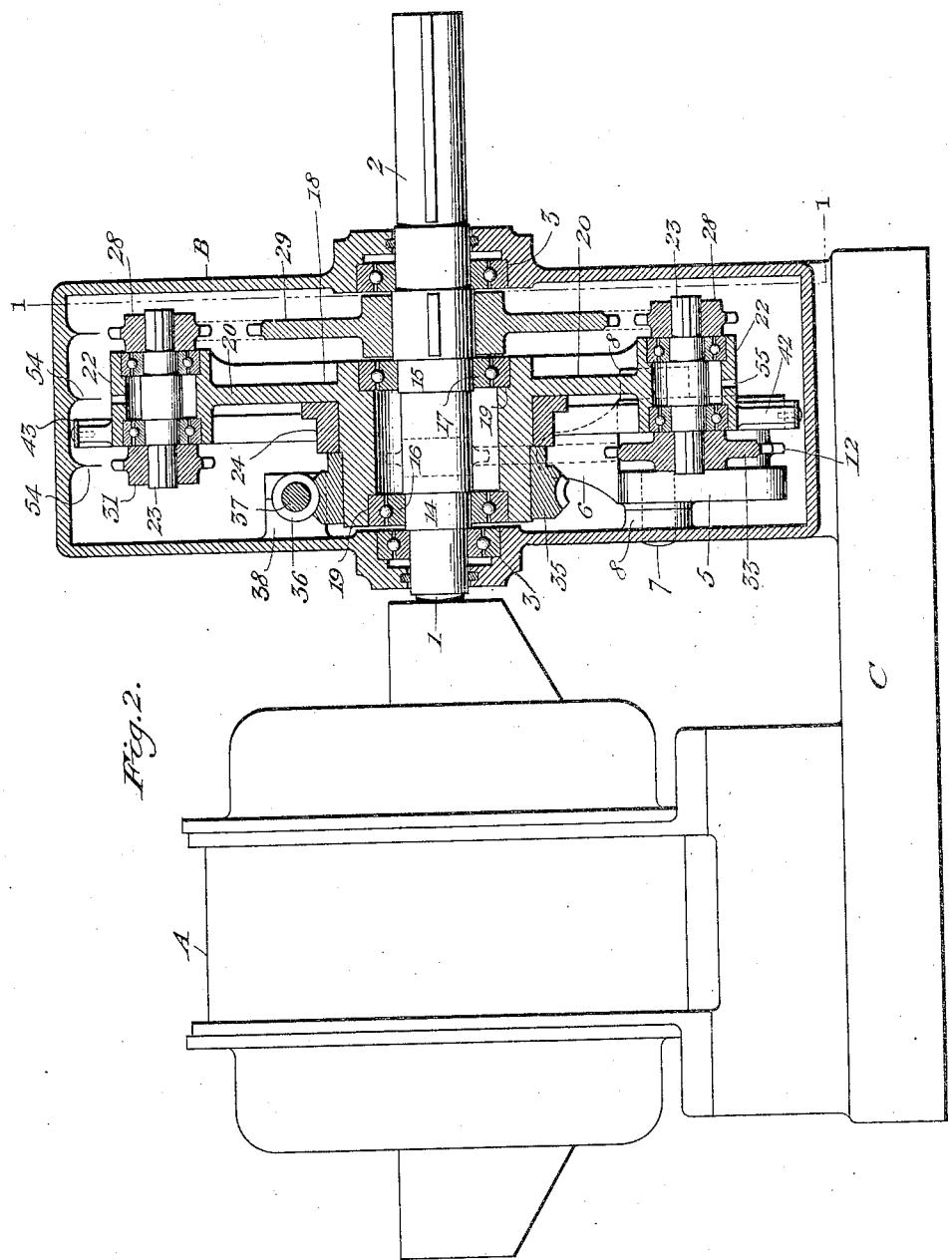

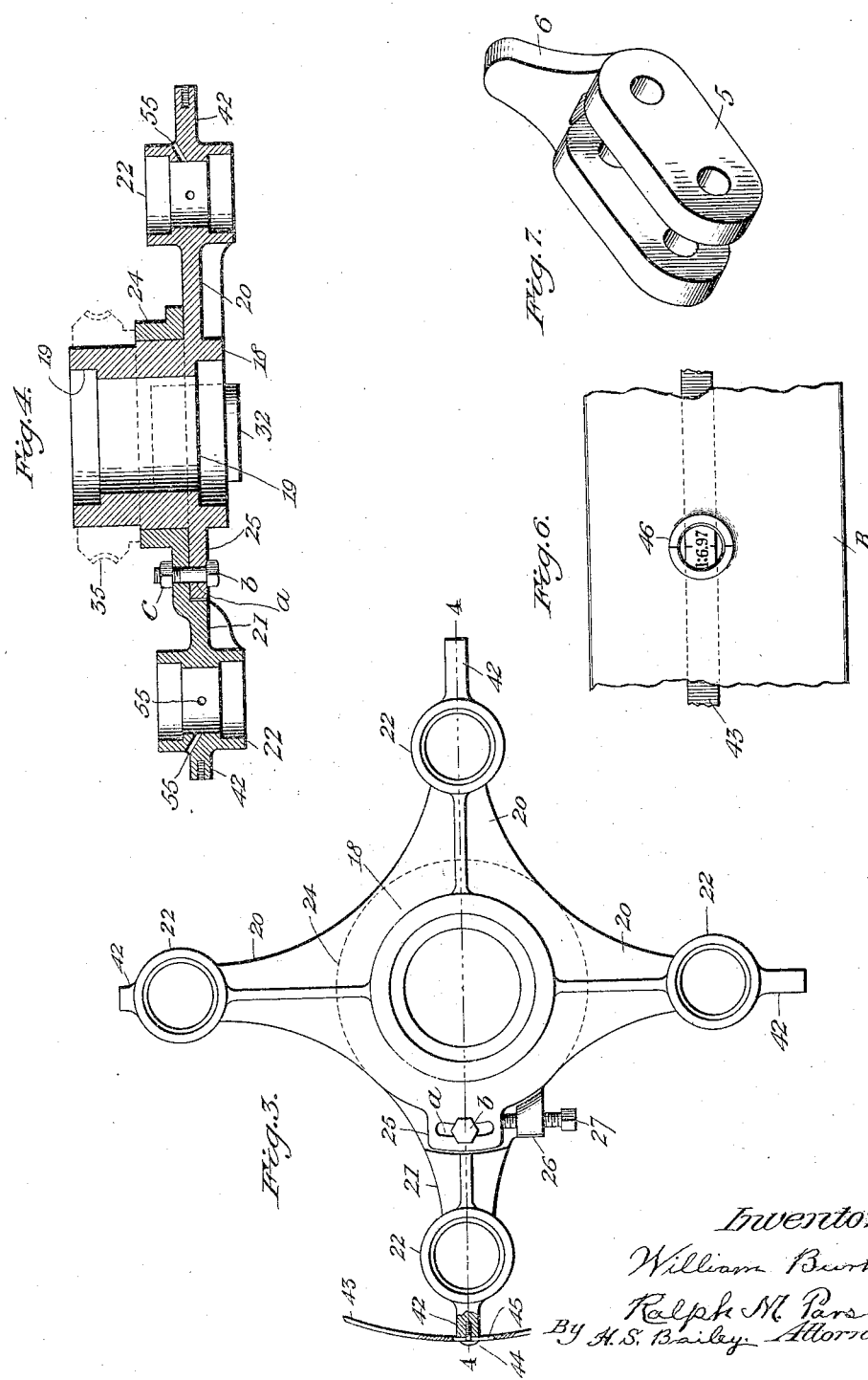

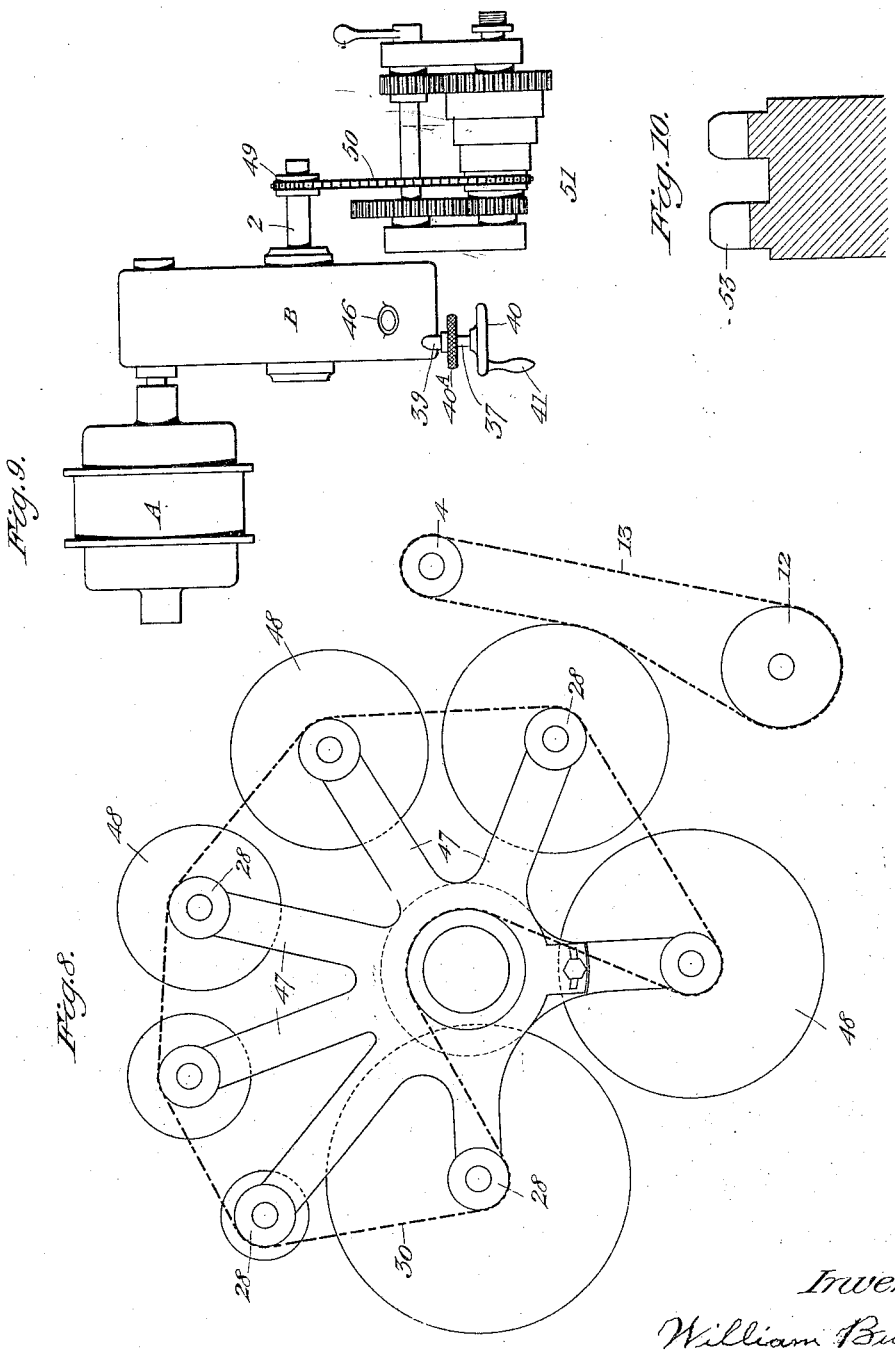

1,869,662

UNITED STATES PATENT OFFICE

WILLIAM BURKART AND RALPH M. PARSONS, OF DENVER, COLORADO; SAID PARSONS ASSIGNOR OF ONE-HALF OF HIS ENTIRE RIGHT TO WILLIAM C. CANDLER, OF LITTLETON, COLORADO

VARIABLE SPEED REDUCER

Application filed February 6, 1931. Serial No. 513,831.

Our invention relates to improvements in variable speed reducers.

The object of the invention is to provide improved mechanism adapted to connect a power shaft and a driving shaft, whereby the driving shaft is caused to rotate at any one of a series of reduced rotations per minute with respect to the rotations per minute of the power shaft.

Further, to provide mechanism comprising a driving shaft; a spider rotatably mounted on said shaft and provided with a series of rotatable shafts having variable toothed sprocket wheels on end, and sprocket wheels on their opposite ends which are connected by an endless chain which also partly surrounds a sprocket wheel, which is keyed to said driving shaft, said latter wheel being of greater diameter than the other chain driven wheels and a power driven endless chain which is adapted to be engaged by any one of the variable toothed sprocket wheels, whereby the speed of the power driven chain is transmitted to the said driving shaft at a reduced number of rotations per minute proportionate to the number of teeth in the wheel engaging the power driven chain.

Further, to provide means for rotating said spider to cause any one of the variable toothed wheels to engage the power driven chain, and means for locking said spider in the desired position.

Further, to provide means for indicating the position of the spider with respect to the power driven chain, together with a sight opening above said indicating means.

These and other objects, which will hereinafter appear, are accomplished by the mechanism illustrated in the accompanying drawings in which:

Fig. 1 is a sectional view through the housing of the improved variable speed reducer, on the line 1—1 of Fig. 2.

Fig. 2 is a sectional view on the line 2—2 of Fig. 1.

Fig. 3 is a front view of the spider which supports the speed reducing sprocket and chain mechanism.

Fig. 4 is a sectional view through the same, on the line 4—4 of Fig. 3.

Fig. 5 is a sectional view through a portion of the housing, showing a portion of the worm shaft for rotating the spider and means for locking the same to hold the spider in a given position.

Fig. 6 is a plan view of a portion of the casing showing a sight opening therein, and means observable through said opening for indicating the position of the spider with respect to the drive chain.

Fig. 7 is a perspective view of the supporting bracket for one of the sprocket wheels of the drive chain.

Fig. 8 is a diagrammatic view showing an endless driving sprocket chain and a spider equipped with seven variable speed sprocket wheels, any one of which is adapted to engage said driving chain.

Fig. 9 is a plan view showing the variable speed reducer arranged to transmit power from a motor to the cone pulley of a lathe, and Fig. 10 is a sectional view of a portion of a sprocket wheel provided with a double series of teeth.

Referring to the accompanying drawings: The letter A designates an electric motor and B the housing for the improved variable speed reducing mechanism. While the reducer is shown in connection with an electric motor, power may also be derived from a gas engine, or a line shaft or any other suitable power source. The motor A and housing B are rigidly mounted on a base C and the housing comprises upper and lower half sections, which are bolted together as shown at D. The motor shaft 1, extends through one end of the housing, and a driving shaft 2 extends through the central portion of the housing and is mounted in ball bearings 3. A sprocket wheel 4 is rigidly mounted on the motor shaft within the housing, and, in present instance, this wheel is provided with thirteen teeth, but a wheel having a greater or less number of teeth may also be used. Below and in line with the wheel 4 is mounted a bracket 5, in the form of a bifurcated member, the upper end of which terminates in an upright tongue 6, as clearly shown in Fig. 7. This bracket is supported on pins 7, which pass through the upper ends of its members and through lugs 8 formed on the housing, and a screw 9 passes through the housing and bears against the tongue 6, for a purpose which will presently appear. A pin 10 is mounted in the lower end of the bracket 5 and carries a roller bearing 11 upon which is mounted a sprocket wheel 12 having the same number of teeth as the sprocket wheel 4, and an endless chain 13 connects the wheels 4 and 12. By turning the screw 9 against the tongue 6, the bracket may be rocked to tighten the chain 13 and to maintain the same under suitable tension.

The driving shaft 2 is stepped at 14 and 15 to receive ball bearings 16 and 17 respectively, and upon these bearings is mounted the hub of a spider 18 comprising the hub and four radial arms, one of which is adjustable as will be later explained. The hub of the spider is counterbored at each end, as shown at 19, to shoulder the outer rings of the ball bearing 16 and 17, and the three rigid radial spider arms 20, and the adjustable spider arm 21 terminate at their outer ends in hubs 22, the ends of which are counterbored as shown. In each of these hubs is mounted a shaft 23 and these shafts are stepped as shown to receive ball bearings, the outer rings of which fit snugly in the counterbored ends of the hubs. The adjustable spider arm 21, is formed with a ring 24, which fits upon the spider hub as shown most clearly in Fig. 4, and bears against the spider arms 20. The rigid arm which is replaced by the adjustable arm 21, is cut off as shown to leave a short projection 25, and the outer end of the arm 21 is offset to extend over the end of the projection 25 and thus be in line with the opposite arm 20. A lug 26 is formed on the ring portion of the arm 21 and is provided with a threaded hole to receive a screw 27 the end of which bears against the projection 25 and by turning the screw against the said projection, the arm 21 may be turned upon the spider, for a purpose which will later appear. The arm 21 and the projection 25 are provided with registering slots $a$ through which is passed a bolt $b$ having a clamp nut $c$ on its free end, and by turning this nut against the arm 21 or the projection 25 as the case may be, the arm 21 is locked in the chain tightening position to which it has been adjusted. On the outer end of each of the shafts 23 is keyed a sprocket wheel 28, each of which is provided with the same number of teeth as the wheels 4 and 12, which in the present instance is thirteen teeth, and on the driving shaft 2, in alignment with the wheels 28, is keyed a sprocket wheel 29, which in the present instance, is provided with forty seven teeth, but any other desired ratio between the teeth of the smaller sprockets and those of the wheel 29 may be employed. A chain 30 partly surrounds the wheel 29 and engages the wheel 28, and by adjusting the spider arm 21, the chain 30 may be tightened and maintained under the required tension.

Upon the opposite ends of the shaft 23 are keyed sprocket wheels 31, 32, 33 and 34, respectively, the wheel 31 having thirteen teeth, the wheel, 32, seventeen teeth, the wheel 33, twenty-one teeth, and the wheel 34, twenty-five teeth, and any one of these wheels may be brought into engagement with the drive chain 13, in order to obtain the desired speed reduction as will be later set forth, and to accomplish this, the spider is turned in the following manner:

Upon the spider hub is rigidly mounted a worm gear ring 35, which meshes with a worm pinion 36 on a shaft 37 which is mounted in bearing 38 on the adjacent housing wall, and extends out through a hub 39 on the peripheral face of the housing, and a wheel 40 having a crank handle 41, is secured upon its outer end. The hub 39 is threaded to receive a clamp nut 40 through which the shaft 37 passes, the nut being provided with a threaded socket. A collar 41 is secured upon the shaft so as to lie between the end of the hub 39 and the bottom of the socket in the nut 40. When the shaft 37 is turned, its worm pinion 36, meshing with the worm gear ring 35, turns the spider to bring any one of the wheels 31, 32, 33, or 34 into engagement with the drive chain 31, and when the spider has beeen turned to the desired position, the nut 40 is turned to clamp the collar 41 between the said nut and the end of the hub 39, thus locking the spider in the desired position.

In order to determine the position of the spider to bring that wheel into engagement with the drive chain 13, which will effect the desired speed reduction; the following method is employed:

The housing B is substantially circular, being extended on the side next to the drive chain 13, the part in which the spider is located being generally concentric with the axis of the drive shaft 2. Upon each of the hubs 22 on the spider arms is formed a radial projection or stud 42 and a thin, circular metal band 43 is secured to these studs by screws 44, the part of the band which is secured to the stud on the adjustable spider arm being slotted as shown at 45 in Fig. 3 where the screw passes through it to permit of the adjustment of the said arm. The housing is provided with a sight opening 46, immediately over the path of the band 43, and the band is provided at four equi-distant points with numerals indicating the different ratios of speed reduction effected by the wheels 31, 32, 33, and 34, the numerals appearing through the sight opening indicating the ratio of speed reduction effected by the sprocket wheel then engaging the drive chain 13. Thus, when a number appears through the sight opening, the wheel corresponding thereto is in engagement with the drive chain 13. While in Fig. 1 the mechanism is arranged to effect four different speed reductions, it may also be arranged for a greater number, as indicated in Fig. 8, which is a diagrammatic view showing a spider having seven arms 47 provided with speed reducing wheels 48 of progressively increasing diameter, or number of teeth, the mechanism otherwise, being in all respects similar to that shown in Fig. 1.

In obtaining speed reduction under present methods, as, for example, when it is desired to operate a lathe under a reduced speed with reference to a power shaft, the stepped cone pulley of the lathe is connected by belt with the stepped cone pulley on a counter shaft which has been relocated close to the head stock of the lathe. This method however, reduces the efficiency of the belt drive, by running on close centers, with the consequent slipping of the belt on small cone pulleys.

In many shops, individual units are operated by individual motors, and in Fig. 9 is shown the adaptation of the variable speed reducer to the individual motor driving of an engine lathe, without interfering with the back gearing on the head stock, which back gearing doubles the number of speed changes provided in the variable speed reducer. In this arrangement, the driving shaft 2 of the variable speed reducer has keyed thereon, a sprocket wheel 49 which is connected by a chain 50 with a ring sprocket wheel 51 which is secured upon one of the cone step pulleys on the head stock of the lathe, and as the wheel 49 is of less diameter than the wheel 51, the speed of the shaft 52 is transmitted to the head stock under a reduction corresponding to the ratio of the diameter of the wheel 49 to that of the wheel 51.

It should be understood, however, that the speed reducer, is adapted to operate any character of unit which is required to run under a speed less than that delivered by a motor or other source of power.

The speed reduction from the motor to the driving shaft 2 of the speed reducer, according to the ratios defined by the sprocket wheels 31, 32, 33, and 34, is as follows: If the motor is running at 1750 rotations per minute, the sprockets 4 and 12 which are connected by the drive chain 13, will have a corresponding number of rotations, these wheels having thirteen teeth each. If the wheel 31 is brought into engagement with the chain 13, the chain 30 will be turned at the same speed as the chain 13, but as the chain 30 operates the wheel 29, having 47 teeth, the speed of this wheel and of the driving shaft 2, to which it is keyed, will be 484 rotations per minute, or a ratio of 3.62:1. When the wheel 32 having seventeen teeth engages the drive chain 13, the reduction will be from 1750 rotations per minute to 372, or a ratio of 4.71:1. When the wheel 33 having 21 teeth engages the drive chain 13, the reduction will be from 1750 rotations per minute to 300 or a ratio of 5.83:1, and when the wheel 34, having 25 teeth engages the chain 13, the reduction will be from 1750 rotations per minute to 251 or a ratio of 6.97:1. Any other desired tooth ratio, however, may be employed, as well as a greater number of speed reducing sprocket wheels, and by turning the spider in the manner described, and observing the band 43 through the sight opening 46 the desired speed reducing sprocket wheels can quickly be brought into engagement with the drive chain 13, and locked in that position by the nut 40. While the sprocket wheels are shown as having a single row of teeth, they may if desired, be provided with a double row, as shown at 53 in Fig. 10, or even with a greater number, thereby insuring a chain of sufficient strength under all conditions.

The housing is preferably filled with oil to the level of the dotted line X, Fig. 1, and the inner face of the upper part of the housing is formed with knife edged ribs 54, which are in line with the spider hubs 22, and with the sprocket wheels carried by said hubs; so that the oil which is thrown against the top of the housing, will be divided by the ribs 54, and caused to drip down upon the spider and the sprockets carried thereby, and the said hubs are provided with holes 55 which permit the oil to enter hubs and lubricate the ball bearings supported therein. While we have shown a continuous band 43, for displaying the different speed reduction ratios, it is obvious that the band can be dispensed with, and short strips used in its place, the strips bearing the designating numerals which are observable through the sight opening, and being secured to the stud 42 by screws the same as the band, the sight opening being correspondingly located.

The construction and arrangement herein described and illustrated in the accompanying drawings, is simple and practical, and embodies the preferred form of the invention, but minor changes in construction may be made without departing from the spirit of the invention.

Having described our invention, what we claim as new and desire to secure by Letters Patent, is:—

1. In a variable speed reducer of the character described, the combination with a power driven chain; of a drive shaft, a rotatable member thereon having a plurality of shafts rotatably mounted therein, in rotative order, sprocket wheels keyed on one end of said shaft having the same number of teeth, a sprocket wheel of greater diameter keyed to said drive shaft and an endless chain which passes over the first mentioned wheels and around the latter wheel, variable toothed sprocket wheels keyed upon the opposite ends of said rotatable shafts, and means for turning said rotatable member to bring any one of the variable toothed wheels into engagement with said power driven chain, said power driven chain being mounted on sprocket wheels having the same number of teeth as the first mentioned wheels.

2. In a variable speed reducer of the character described the combination with a power shaft, of a bracket, sprocket wheels on said power shaft and bracket having the same number of teeth and a chain connecting said wheels; a drive shaft, a spider rotatably mounted thereon and provided with a plurality of rotatable shafts arranged in order of rotation of the spider, variable toothed sprocket wheels on one end of said shafts and means for turning the spider to cause any one of said wheels to engage the power driven chain, similar toothed sprocket wheels on the other end of said shaft having the same number of teeth as the wheels of the power driven chain, a sprocket wheel of greater diameter than the similar toothed wheels which is keyed to the drive shaft, an endless chain connecting said similar toothed wheels and partly surrounding the latter wheel, and means for locking the spider in a desired position.

3. In variable speed reducer of the character described, the combination with a housing, of a power shaft extending therethrough having a sprocket wheel thereon, a bracket adjustably supported in the housing, a sprocket wheel supported thereby having the same number of teeth as the wheel on the power shaft, and a chain connecting said wheels, a drive shaft mounted in the housing, a spider rotatably mounted thereon having an extended hub, and a plurality of shafts rotatably mounted in the extremities of its arms, variable toothed sprocket wheels keyed upon one end of said shafts any one of which is adapted to engage the power driven chain, similar toothed sprocket wheels on the other ends of said shafts, a sprocket wheel of greater diameter than the similar toothed wheels, which is keyed to the drive shaft, a chain connecting the similar toothed wheels and partly surrounding the latter wheel, a worm gear ring secured upon the spider hub, a manually operable shaft having a worm pinion thereon in mesh with said worm gear, thereby to rotate said spider, and means for locking said manually operable shaft against rotation.

4. In variable speed reducer, a housing, a drive shaft extending therethrough, a spider rotatable on said shaft, having shafts rotatably mounted in its ends, variable toothed wheels keyed on one end of said shafts, similar toothed wheels keyed upon the other ends of said shafts; a sprocket wheel of greater diameter than the similar toothed wheels, which is keyed to the drive shaft and a chain connecting the similar toothed wheels and partly surrounding the latter wheel, one of the spider arms being adjustable, means to adjust said arm thereby to give the proper tension to said chain, a power driven endless chain supported in said housing, means for rotating said spider to cause any one of said variable toothed wheels to engage said power driven chain, means carried by the spider for indicating the particular wheel which engages the power driven chain, and a sight opening in said housing, above said indicating means.

5. Mechanism according to claim 3, in which the housing is provided with a hub through which the manually operable shaft passes, a socketed nut threaded to said hub through which said shaft passes, and a rigid collar on the shaft between the end of the hub and the end of the nut socket, which is adapted to be clamped between the nut and the hub, thereby to lock said shaft against rotation.

6. Mechanism according to claim 3, in which the adjustable bracket comprises parallel members connected at their upper end by an integral tongue, the sprocket wheel carried by said bracket being positioned between the two members and mounted on a pin which passes through the lower ends of said members, the upper ends of said members being pivotally secured to the housing, and a screw which passes through said housing and bears against the upper end of the tongue.

7. In a variable speed reducer, the combination with a power driven endless chain, of a plurality of variable toothed wheels arranged in rotative order for engaging said chain, a drive shaft, a relatively large sprocket wheel keyed to said shaft, similar toothed wheels corresponding in number to the variable toothed wheels and rotatable therewith, and a chain connecting the similar toothed wheels and partially surrounding the relatively large wheel.

In testimony whereof, we affix our signatures.

WILLIAM BURKART.
RALPH M. PARSONS.